United States Patent [19]

Ruckenbauer et al.

[11] 4,441,044
[45] Apr. 3, 1984

[54] TRANSDUCER WITH A PIEZOELECTRIC SENSOR ELEMENT

[75] Inventors: Friedrich Ruckenbauer; Peter Claassen; Peter Krempl, all of Graz, Austria

[73] Assignee: Hans List, Graz, Austria

[21] Appl. No.: 378,272

[22] Filed: May 14, 1982

[30] Foreign Application Priority Data

May 20, 1981 [AT] Austria .................. 2267/81

[51] Int. Cl.$^3$ ........................................... H01L 41/08
[52] U.S. Cl. ..................................... 310/338; 310/329; 73/517 AV; 73/516 R
[58] Field of Search ................ 310/329, 328, 330–333, 310/366, 322, 323, 324; 73/DIG. 4, 517 R, 517 AV, 518, 516 R

[56] References Cited

U.S. PATENT DOCUMENTS

| 2,507,636 | 5/1950 | Kistler | 310/338 |
| 3,045,131 | 7/1962 | Orlacchio | 310/329 |
| 3,070,996 | 1/1963 | Schloss et al. | 310/329 X |
| 3,082,334 | 3/1963 | Riesen | 310/338 |
| 3,185,869 | 5/1965 | Shoor | 310/329 X |
| 3,274,539 | 9/1966 | Sykes | 310/329 X |
| 3,297,968 | 1/1967 | Fowler | 310/366 X |
| 3,311,873 | 3/1967 | Schloss | 310/329 X |
| 3,651,353 | 3/1972 | Hugli et al. | 310/329 X |
| 4,197,478 | 4/1980 | Sivus | 310/329 X |
| 4,258,572 | 3/1981 | Loper, Jr. | 310/329 X |
| 4,268,912 | 5/1981 | Congdon | 310/366 X |
| 4,346,597 | 8/1982 | Cullen | 310/329 X |

FOREIGN PATENT DOCUMENTS 306402 6/1970 Austria .
763226 12/1956 United Kingdom ................ 310/329

Primary Examiner—Mark O. Budd
Attorney, Agent, or Firm—Watson, Cole, Grindle & Watson

[57] ABSTRACT

In addition to having at least one piezoelectric sensor element, a transducer is provided with at least one further measuring element, which is influenced by the state variable to be measured in the same way as the piezoelectric sensor element, and has its own signal lead.

The additional measuring element may also be a piezoelectric element which may be excited so as to produce mechanical vibrations by utilizing the inverse piezo-effect, the change of the vibration characteristics of the vibration system consisting of the excited piezo-element and its environment serving as a measurement value for a static or quasi-static measurement.

8 Claims, 11 Drawing Figures

TRANSDUCER WITH A PIEZOELECTRIC SENSOR ELEMENT

BACKGROUND OF THE INVENTION

The present invention relates to a transducer comprising at least one piezoelectric sensor element which is connected via contact electrodes to a signal lead carrying the measurement signals corresponding to the state variable to be measured.

DESCRIPTION OF THE PRIOR ART

A similar type of transducer is described in Austrian Pat. No. 276 810, which may be used, e.g., for monitoring the combustion process in the combustion chamber of an internal combustion engine. For this purpose the transducer is inserted into a test bore in the wall of the combustion chamber, thereby sealing the bore, and a suitable measuring amplifier is connected to the signal terminal of the transducer for the evaluation of the measurement signals generated via the piezoelectric effort of the piezoelelectric sensor elements by pressure variations in the combustion chamber. This known type of transducer suffers from the disadvantage that, due to the use of piezoelectric sensor elements which may undergo considerable zero shifts on account of the usual resistances and leakage currents, valid measurements may only be taken of dynamic pressure changes, i.e., of changes of state variables occurring with a certain frequency, whereas absolute or static measurements are not possible with this kind of device.

On the other hand transducers are known which lend themselves to static or quasi-static measurements on account of the type and arrangement of their sensor elements, or rather because of the kind of evaluation of the measurement signals. Thus a transducer is described in Austrian Pat. No. 353 506 which permits the measurement of various physical variables, e.g., temperature or pressure, utilizing changes in the vibration characteristics of a piezoelectric resonator in the transducer. Such transducers are characterized by a very high resolution, which is accompanied by a small dynamic range, however, because of the high count rates required. Morever, a transducer is known, e.g., from Austrian Pat. No. 306 402, using a foil strain gauge glued to an expansion sleeve for a sensor element. The drawbacks of such transducers are the low heat resistance of the glued parts and the poor resolution of the strain gauges themselves.

SUMMARY OF THE INVENTION

It is an object of the present invention to avoid the disadvantages of the known types of transducers and to describe a transducer which offers the high resolution and good dynamical range of sensor elements utilizing the direct piezoelectric effect, and which may also be used for static and quasi-static measurements.

According to the present invention this is achieved by providing the transducer with at least one additional measuring element for static or quasi-static measurements, which is influenced by the state variable to be measured in the same way as the piezoelectric sensor element and which has a signal lead independent of the piezoelectric sensor element. In this type of transducer the advantages of sensor elements utilizing the direct piezoelectric effect are combined with those of measuring elements suitable for static or quasi-static measurements, the resultant measurement values of both static/quasi-static and dynamic measurements being directly comparable, since the variable to be measured will influence both measuring elements in the same way.

An enhanced version of the invention provides that a foil strain gauge is used as an additional measuring element for static or quasi-static measurements, which is fastened to the prestressing element of the piezoelectric sensor element. This will permit a simple design of the transducer and will ensure that the two sensor elements are influenced by the variable to be measured in the same way.

According to another proposal of this invention the additional measuring element may be a plate capacitor whose one plate is mechanically linked to a part which will change its position relative to the other plate as the variable to be measured changes. Thus the determination of the capacitance of this plate capacitor, which will change with the variable to be measured, will permit static or quasi-static measurements in a simple way.

In a particularly advantageous variant of the present invention the additional measuring element also is a piezoelectric element which may be stimulated to vibrate mechanically, i.e., by applying an a/c voltage via its signal lead and by utilizing the inverse piezo effect, the change in the vibration characteristics of the vibration system consisting of the excited additional piezo element and its environment serving as a measurement value for a static or quasi-static measurement. Thus the additional measuring element is a piezoelectric resonator of a very high resolution which is suitable for absolute or static/quasi-static measurements. According to another proposal of the invention it will be of particular advantage in this context for both piezoelectric sensor elements to have the same sensitivity for the variable to be measured. This will make the two sensor elements functionally exchangeable by a simple switch-over of their signal leads, thereby simplifying the measuring procedure.

According to another proposal of the invention the piezoelectric elements are series-connected with regard to their function, which will result in a greater sensitivity for a given membrane area. In another variant the sensor element for the dynamic measurement may be contacted in such a way as to utilize the piezoelectric transverse effect and may be placed into a pre-stressing sleeve together with another measuring element for static/quasistatic measurements which has been contacted so as to utilize the piezoelectric longitudinal effect.

According to another variant of the invention the piezoelectric sensor elements are parallel-connected as regards their functions, an additional advantage being offered by the use of a disk-shaped piezoelectric crystal as a sensor element, one side of which carries two contact electrodes insulated from each other while the opposite side is provided with one common contact electrode. This set-up will permit a symmetrical design of the transducer.

Finally, a further enhancement provides that both the sensor element for dynamic measuring and that for static measuring are contacted so as to utilize the piezoelectric transverse effect, which will offer another simple possibility of achieving a symmetrical set-up and identical sensitivities.

According to another proposal of the present invention the change in the parallel capacitance of at least one of the piezoelectric sensor elements may be directly employed for static or quasi-static measurements. In this case the capacitance change following a change of distance of the opposing contact electrodes is directly used for measuring, which will result in a very simple assembly of the transducer.

It will be of particular advantage to apply an a/c excitation voltage of variable frequency to at least one piezoelectric sensor element and to use the measurement signals obtained in this way via at least one of the other measuring elements for determining the frequency characteristic of the transducer, as this will eliminate the need for an additional mechanical measuring device for transducer calibration, and will permit the use of the measurement electronics already present in the evaluation unit required for the measurement.

DESCRIPTION OF THE DRAWINGS

Following is a more detailed description of the present invention as illustrated by the exemplary embodiments of the enclosed drawings, wherein.

DESCRIPTION OF THE PREFERRED EMBODIMENTS

Figure 1:
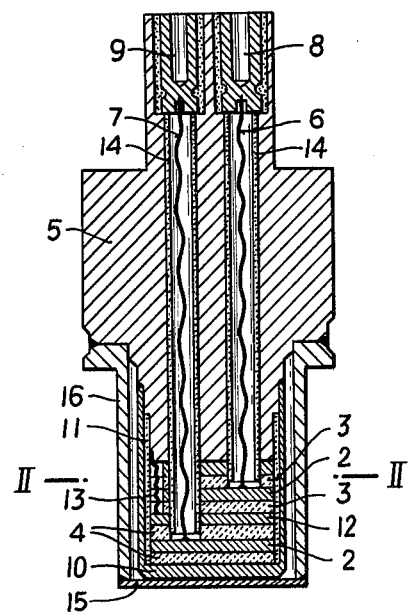
FIG. 1 is a longitudinal section of a transducer according to the present invention.
Figure 2:
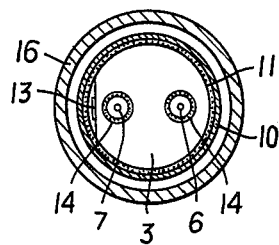
FIG. 2 is a section along line II—II in FIG. 1.

The transducer according to FIGS. 1 and 2 is provided with two piezoelectric sensor elements 3, 4, each consisting of two disk-shaped platelets of a piezoelectric material, which are series-connected as regards their functions. The sensor elements 3, 4, or rather their individual platelets, are contacted by suitable contact electrodes so as to utilize the piezoelectric longitudinal effect, one electrode being connected to the housing 5 of the transducer, while the other one is connected via metal platelets 2 and signal leads 6 and 7 to the sockets 8 and 9 which are insulated against the housing. Since the sensor elements 3, 4, including the contact electrodes, are pre-stressed relative to the housing 5 of the transducer 1 by a metal pre-stressing sleeve 10, an insulating sleeve 11 has been inserted into the pre-stressing sleeve 10 in the area of the sensor elements in order to protect the contact electrodes from short-circuiting. The contact to ground of the two innermost piezoelectric platelets of the sensor elements 3, 4, which has been interrupted on account of this insulating sleeve, is re-established by means of an intermediate platelet 12, which in turn is connected to housing ground by a connecting lead 13. The signal leads 6, 7 also are provided with insulating sleeves 14 in order to avoid short-circuiting.

The bottom of the pre-stressing sleeve 10 is in direct contact with a membrane 15 which is fastened to a holder 16 and will seal the interior of the transducer against the measurement environment (not shown).

Dynamic pressure changes, e.g., resulting in dynamic changes of the forces acting upon the membrane, are measured by utilizing the direct piezo-effect; the signals given off by one of the two sensor elements are fed into an amplifier (not shown) connected via the corresponding socket. For static or quasi-static measurements the other one of the two sensor elements which, due to their configuration, have approximately the same sensitivity, is used to induce mechanical vibrations of a high frequency, e.g., via thickness variation of a platelet or of the whole sensor element, by applying an a/c voltage via the signal lead 6 or 7. The change in vibration characteristics, e.g., in case of a change in the exterior pressure in front of membrane 15 and thus in the force exerted upon the pre-stressing sleeve, may then be transformed into a measurement value corresponding to the state variable to be measured by means of an evaluation unit (not shown) connected to the respective socket, which may be combined with that for the dynamic measurement. Besides, the frequency characteristics of the entire transducer may be determined by exciting one of the sensor elements via the inverse piezoelectric effects using a variable-frequency a/c voltage, and by deriving the output signal from the second sensor element.

Figure 3:
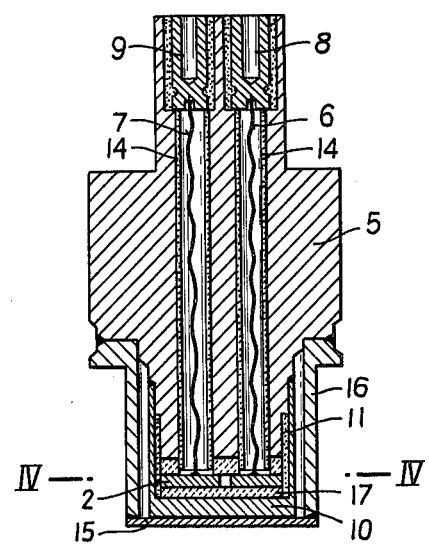
FIG. 3 is a section through another variant of the invention.
Figure 4:
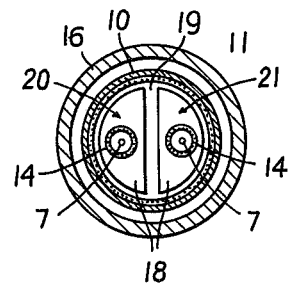
FIG. 4 is a section along line IV—IV in FIG. 3.
Figure 5:
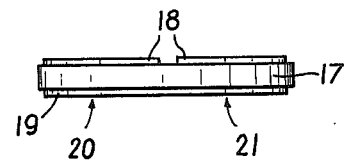
FIG. 5 is an enlarged view of the measuring element of the transducer shown in FIGS. 3 and 4.

The transducer in FIGS. 3 to 5 is provided with one piezoelectric element 17 only, consisting of two piezoelectric platelets and the respective contact electrodes. As is shown above all in the enlarged view of the lower one of the piezoelectric crystal platelets (cf. FIG. 5), one side of each piezoelectric platelet of element 17 is contacted by two contact electrodes 18 insulated from each other, while the other side is contacted by one common contact electrode 19. The transducer shown in FIGS. 3 to 5 has essentially the same structure as the one discussed under FIGS. 1 and 2; corresponding parts are given the same reference numbers.

The two-part contact electrodes 18 on one side of the piezoelectric crystals and the separate signal leads (FIGS. 3, 4) for the two halves of element 17 which are functionally independent on account of this separation, practically constitute two individual sensor elements 20, 21 which are parallel-connected with regard to their function. The advantage of this type of transducer lies in its symmetrical structure and thus in the fact of the complete equivalence of the two measuring elements, one of which is used for measuring dynamic changes of the state variables to be measured via the direct piezo-effect, while the other one may be employed for static or quasi-static measurements via the changes of its resonance characteristics (cf. description of FIGS. 1 and 2).

Figure 6:
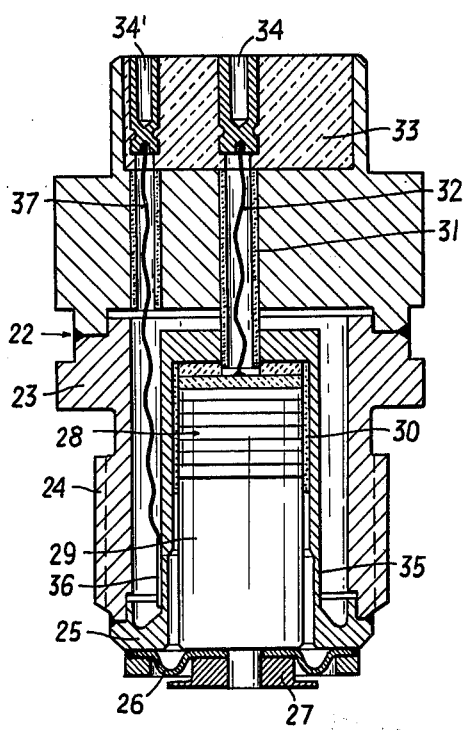
FIG. 6 is a longitudinal section of another variant of the invention.

The transducer shown in FIG. 6 has a two-part housing 22, the lower half 23 of which is provided with an external thread 24 for screwing the transducer into a bore (not shown) in the wall of a measuring chamber. A pre-stressing sleeve 25 is fastened to the bottom of the housing, to which a membrane 26 with a heat shield 27 is welded so as to provide a seal. The pre-stressing sleeve 25 contains a piezoelectric sensor element 28 consisting of a set of quartz platelets, which is linked to the membrane 26 by a plunger 29. One pole of the piezoelectric sensor element 28 which is insulated against the pre-stressing sleeve by an insulating sleeve 30, is connected to housing ground whereas the other one is connected to a socket 34 in an insulator 33 via a signal lead 32 provided with an insulating sleeve 31.

In an area 35 of reduced wall thickness a foil strain gauge 36 is fastened on the outside of the pre-stressing sleeve 26, one pole again being connected to housing ground while the other one is connected to another socket 34' via a signal lead 37.

In this variant the piezoelectric sensor element 28 is used for the dynamic measurement of the state variable in question, and the strain gauge 36 is used for static/quasi-static measurement.

Figure 7:
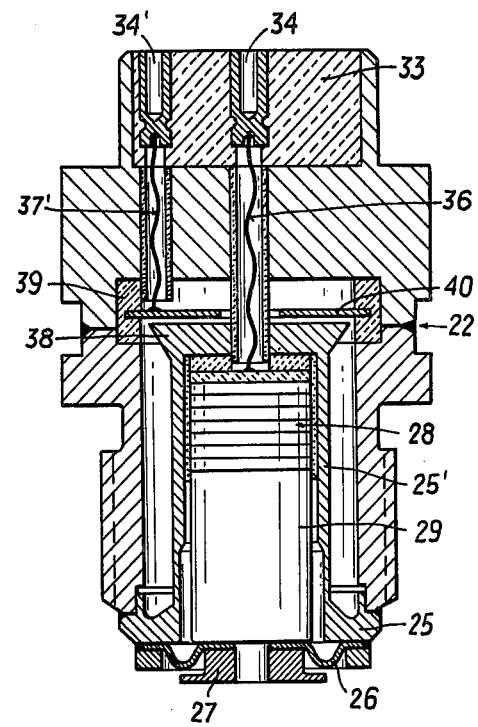
FIG. 7 is a longitudinal section of another version of a transducer according to the present invention.

The transducer shown in FIG. 7 differs from that in FIG. 6 by the use of a plate capacitor for static or quasi-satic measurements, one plate 38 of which is formed by the enlarged bottom of the pre-stressing sleeve 25', while the other one is represented by a metal platelet 40 insulated against the housing 22 by means of an insulating ring 39, which platelet 40 is connected to the socket 34' via the signal lead 37'. In this design variant the change of distance between plate 38 and metal platelet 40, e.g., caused by an expansion of the pre-stressing sleeve 25, or rather the resultant capacitance change of the plate capacitor, may be used for static or quasi-static measurements.

Figure 8:
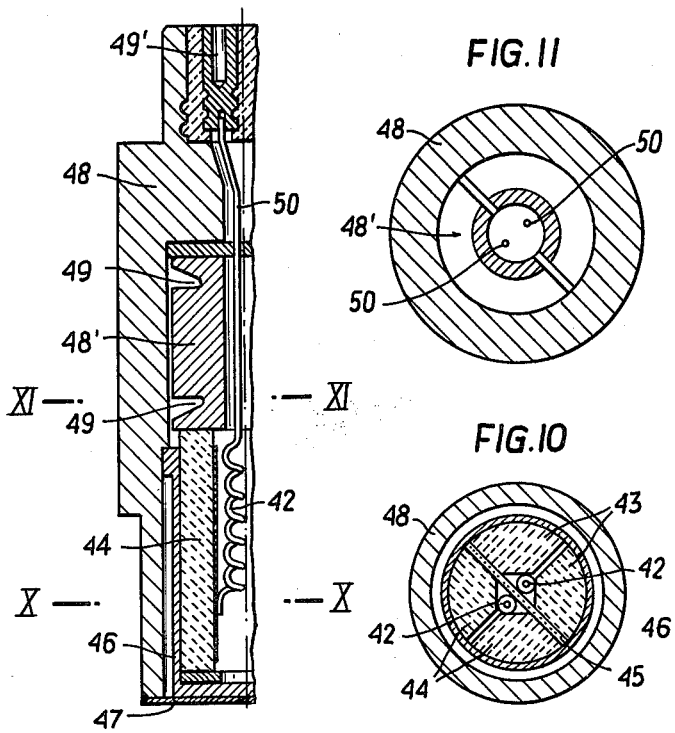
FIG. 8 is a partial longitudinal section of another embodiment of the invention.
Figure 11:
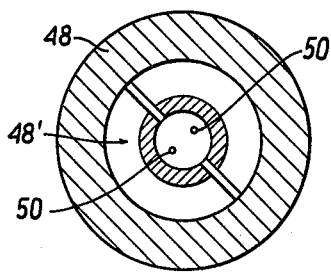
FIG. 11 is a section along line XI—XI in FIG. 8.
Figure 10:
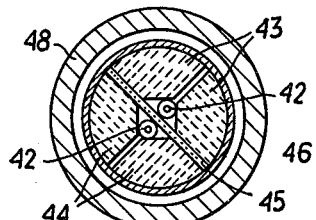
FIG. 10 is a section along line X—X in FIG. 8.

The transducer according to FIGS. 8, 10, 11 is provided with four piezoelectric elements which are contacted and parallel-connected with regard to their functions so as to utilize the piezoelectric transverse effect. A worm-spring type central contact electrode 42 is used for contacting two elements at a time. The remaining pole of the piezoelectric sensor elements is again connected to housing ground. The pairs of sensor elements 43, 44 are insulated by an insulating layer 45 which may also contain a grounded metal foil not shown in this drawing. The piezoelectric sensor elements are placed in a pre-stressing sleeve 46 which may be influenced by the state variable to be measured via a membrane 47. In addition, the housing 48 of the transducer is provided with a pressure transmitter 48' which is also influenced by the pre-stressing sleeve 46 via the sensor elements and which has two grooves 49 running around its circumference. These grooves will reduce attenuation of the longitudinal and radial vibrations of the pressure transmitter, thereby improving the quality of the characteristic vibration modes and ensuring a greater accuracy of measuring. For better de-coupling of the vibrations the pressure transmitter 48' is provided with diametrical slots (cf. FIG. 11).

The upper part of the housing 48 is again provided with sockets 49' which are connected to the contact electrodes 42 via the signal leads 50.

The parallel arrangement of the pairs of sensor elements with regard to their function, again will ensure in an advantageous manner an approximately equal sensitivity for dynamic as well as static or quasi-static measurements, these measurements being performed as described under FIGS. 1 and 2, with the employment of the pairs of sensor elements being optimal.

Figure 9:
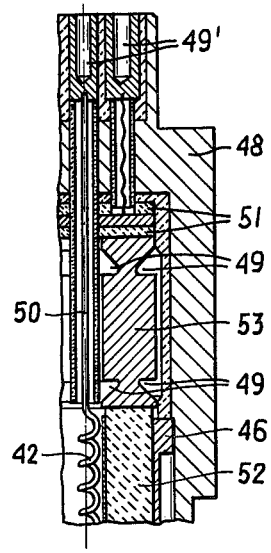
FIG. 9 is a partial longitudinal section of another transducer variant according to the invention.

The transducer of FIG. 9 differs from that of FIGS. 8, 10, 11 mainly by the measuring element 51 used for static measurements, which consists of piezoelectric platelets contacted so as to utilize the piezoelectric longitudinal effect and separated from the transversely operating sensor elements 52 used for dynamic measurements by means of a pressure transmitter 53. The pressure transmitter 53 is provided with grooves 49 for the improvement of the quality of the characteristic vibration modes.

The transducer variants described above offer a simple method of performing static or quasi-static measurements of a high accuracy, while retaining the advantages of conventional piezoelectric transducers with regard to dynamic measurements.

We claim:

1. A transducer for measuring state variables such as pressure and mechanical force, said transducer comprising at least one piezoelectric sensor element for dynamic measurements having contact electrodes, a signal lead being connected to said contact electrodes for carrying the measurement signals from said at least one piezoelectric sensor element which correspond to the values of the state variable to be measured, and at least one additional measuring element for static or quasi-static measurements which in influenced by the state variable to be measured in the same way as said piezoelectric sensor element and which has an additional signal lead independent of said piezoelectric sensor element, wherein said additional measuring element is a plate capacitor whose one plate is mechanically linked to a part of the transducer which will change its position relative to the other plate as the variable to be measured changes, wherein an a/c excitation voltage of variable frequency may be applied via said signal lead to at least one piezoelectric sensor element, and wherein the measurement signals obtained in this way via said additional signal lead of at least one of the other measuring elements may be used for determining the frequency characteristic of said transducer.

2. A transducer as in claim 1, wherein said plate capacitor comprises a dielectric of piezoelectric material which is in contact with said plates and may be stimulated to vibrate mechanically by applying an a/c voltage via said additional signal lead and by utilizing the inverse piezoeffect, the change in the vibration characteristics of the vibration system consisting of said excited additional measuring element and its environment serving as a measurement value for a static or quasi-static measurement.

3. A transducer as in claim 1, wherein both said at least one piezoelectric sensor element and said at least one additional measuring element have the same sensitivity for the state variable to be measured.

4. A transducer as in claim 3, wherein both said at least one piezoelectric sensor element and said at least one additional measuring element are series-connected with regard to their function.

5. A transducer as in claim 2, wherein said at least one piezoelectric sensor element for the dynamic measurement is contacted in such a way as to utilize the piezoelectric transverse effect and is placed into a pre-stressing sleeve together with said other measuring element for static or quasi-static measurements which is contacted so as to utilize the piezoelectric longitudinal effect.

6. A transducer as in claim 2, wherein both said at least one piezoelectric sensor element and said at least one additional measuring element are parallel-connected with regard to their function.

7. A transducer as in claim 6, wherein a disc-shaped piezoelectric crystal is used for said piezoelectric sensor elements, one side of which carries two contact electrodes insulated from each other while the opposite side is provided with one common contact electrode.

8. A transducer as in claim 2, wherein the charge in the parallel capacitance of at least one of said piezoelectric sensor elements is employed for static or quasi-static measurements.

* * * * *